US012105846B2

(12) United States Patent
Ciobotaru et al.

(10) Patent No.: US 12,105,846 B2
(45) Date of Patent: Oct. 1, 2024

(54) PRIVACY SUPPORTING MESSAGING SYSTEMS AND METHODS (71) Applicant: Verve Group Inc., Carlsbad, CA (US)

(72) Inventors: Ionut Ciobotaru, Berlin (DE); Hoi-Ming Chi, San Diego, CA (US); Upneet Dhaliwal, San Diego, CA (US); Eros Garcia Ponte, Berlin (DE); Alexander Savelyev, Berlin (DE)

(73) Assignee: Verve Group Inc., Carlsbad, CA (US)

( * ) Notice: Subject to any disclaimer, the term of this patent is extended or adjusted under 35 U.S.C. 154(b) by 0 days.

(21) Appl. No.: 17/480,459

(22) Filed: Sep. 21, 2021

(65) Prior Publication Data
US 2022/0092215 A1 Mar. 24, 2022

Related U.S. Application Data (60) Provisional application No. 63/080,951, filed on Sep. 21, 2020.

(51) Int. Cl.
G06F 21/62 (2013.01)
H04L 9/40 (2022.01)

(52) U.S. Cl.
CPC ...... *G06F 21/6254* (2013.01); *H04L 63/0421* (2013.01); *G06F 2221/2115* (2013.01)

(58) Field of Classification Search
CPC .. G06F 21/62; G06F 21/6218; G06F 21/6245; G06F 21/6254; G06F 2221/2115; H04L 63/0407; H04L 63/0421; G06Q 30/0201; G06Q 30/0204; G06Q 30/0251
See application file for complete search history.

(56) References Cited

U.S. PATENT DOCUMENTS

| 2007/0011039 | A1 | 1/2007 | Oddo |
| 2010/0228614 | A1* | 9/2010 | Zhang ............... G06Q 30/0269 705/14.66 |
| 2015/0242760 | A1* | 8/2015 | Miao ..................... G06N 20/00 706/12 |
| 2017/0091824 | A1 | 3/2017 | Leith et al. |
| 2018/0204230 | A1* | 7/2018 | Cai .................... G06Q 30/0269 |
| 2022/0114616 | A1* | 4/2022 | Ingram .............. G06Q 30/0251 |

OTHER PUBLICATIONS

Extended European Search Report issued Feb. 15, 2022 for EP Application No. 21198123.8, 10 pages.

* cited by examiner

*Primary Examiner* — D'Arcy Winston Straub
(74) *Attorney, Agent, or Firm* — Schwabe, Williamson & Wyatt, P.C.

(57) ABSTRACT

Systems and methods are provided for providing targeted messaging to a user of a user device without requiring transmittal of personal information from the user device. The user device employs one or more machine learning models to obtain analytic data that reflects the demographics of the user from personal information. This analytic data is then provided to a central server without transmission of the personal information. The central server uses the analytic data to obtain messaging from one or more third party providers that is targeted to the user of the user device, which is provided to the user device for display to the user. Other embodiments may be described and/or claimed.

17 Claims, 5 Drawing Sheets

FIG. 4

PRIVACY SUPPORTING MESSAGING SYSTEMS AND METHODS

CROSS-REFERENCE TO RELATED APPLICATION

This application claims the priority benefit of the earlier filing date of U.S. Provisional Patent Application No. 63/080,951, filed Sep. 21, 2020, which is hereby incorporated herein by reference in its entirety.

TECHNICAL FIELD

Disclosed embodiments are directed to protocols for messaging across a network, and in particular, to anonymized or privacy-compliant messaging between two or more devices across the Internet.

BACKGROUND

Modern devices, including mobile devices such as smartphones and tablets, and computers, including laptops, desktops, and servers, are capable of running a variety of applications that can communicate with remote systems via a network, such as the Internet. The content presented by these applications to users can vary based upon data exchanged over the Internet. In some scenarios, data received from the device may be about one or more aspects of the user, to allow delivered content to be targeted to the user.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Devices routinely exchange data across networks such as the Internet. Some of this data takes the form of messages or messaging content. While a message can be broadly understood as an exchange of data within the context of computing, as used herein, a "message" is a user-consumable communication or communication that can supply or form at least part of a user-consumable communication, such as an advertisement, suggestion, or other content that may be pushed, displayed, or otherwise provided to a user.

Advertising messaging, for one example, can drive business and be a significant source of revenue. Often, ad revenue is based upon conversion rates. For Internet-based ads, a typical billing model is cost per click (CPC), or cost per mille (CPM), defined as the number of responses (in the form of viewing or clicking or otherwise interacting with an ad). A higher CPC or CPM amount is a higher price. As is known, a consumer is significantly more likely to engage with an ad or similar message when the ad is relevant to the consumer, such as targeting a consumer's specific interests or needs. Conversely, an ad message that is disseminated without regard to consumer preferences and/or attributes will typically have a lower CPC or CPM than a targeted ad. Thus, targeting of ads is preferable both for the advertiser, who can see a greater return on investment for their advertising dollars, as well as consumers, who are presented with fewer ads that are irrelevant to them.

Other types of messaging can also benefit from targeting. For example, media platforms such as a streaming music and/or video service often provide messaging to users in the form of suggested media for consumption, such as recommended songs or movies, lists of currently trending songs or movies, media lists based upon popularity, etc. As with ads, such media suggestions are more effective when targeted to a particular consumer's preferences.

Effective targeting typically requires obtaining information about a user that provides insight into that user's likely preferences and/or behaviors. In some instances, a user may directly indicate their preferences, e.g. informing a messaging system of areas of interest and/or desired types of messaging. In other instances, where the user is unwilling or unable to directly indicate their preferences, a user's likely preferences can be inferred from data about the user, such as frequented websites, interactions with various services and social media, location, observational data, and even demographic information such as age, gender, nationality, geographic location, etc. Within a given service, a user's preferences may be ascertained by a number of different techniques, such as direct questioning or interaction, monitoring a user for media flagged as preferred, and/or monitoring the types of media a user listens to over time. Such information may then allow the service to provide tailored suggestions to the user that are more likely to engage the user. However, such suggestions are typically limited only to within a service.

As mentioned above, providing targeted messaging typically requires obtaining personal information for a given user or consumer. Information relevant for targeting may include personally identifiable information, such as mobile device identifier (MSIN), IP address, Identifiers for Advertisers (e.g. IDFA), media consumption habits, geolocation tracking (e.g. various locations visited over time) and other behavioral data, as well as other relevant data such as likes, dislikes, preferences, shopping habits and preferences. Other data may include demographic information, such as household and/or personal income amounts, home address(es), business address(es), age, gender, etc. For tailoring of messaging across services, such as targeting ads that may be displayed within various apps from different third parties or providing cross-platform media suggestions, this data typically must be shared with one or more third-party systems.

Disclosure of such personal information may result in such data being utilized for identity theft, personal humiliation/embarrassment, harassment, discrimination, extortion, unfair business advantages, or other improper uses. In response, many governments and government agencies have begun to impose regulations governing the acquisition, storage, dissemination, and use of personal information. Such regulations can pose barriers to targeted messaging. Thus, as user data becomes increasingly regulated (either by governments or platforms themselves) there is a need for a technology that allows collection and analysis of personal user data, and that enables or facilitates targeted advertising between devices to facilitate targeted advertising, but in a privacy-first manner without the transfer of user data to devices or systems that are outside of the direct control of the user who's data is collected and analyzed. Furthermore, such a design can also enable creation of an ecosystem for targeted advertising that places near total or total control into the hands of the ecosystem operator or publisher, with users of devices within the ecosystem retaining control over their personal information.

Disclosed embodiments include systems and methods for providing targeted messaging to a user via a computing platform, but that maintains security and integrity of personal information, thus allowing for compliance with privacy regulations. In embodiments, personal information may be collected by a user's device and processed or digested locally to determine preferences, rather than transferring such personal information over a network to one or more remote devices or services, where such personal information may be intercepted in transmission and/or extracted from the remote device or service if compromised. In contrast, by keeping the personal information local to the user's device, the user remains in control of the personal information, and can place whatever security measures the user deems prudent upon the user's device to prevent compromise of their personal information. This digested information or preference information may then be transferred or otherwise utilized for targeted messaging without having to transfer any, or only minimal (e.g. sanitized or regulation-compliant) personal information. In some embodiments, machine learning techniques may be used for processing to obtain digests of personal information that more accurately reflect user demographics and preferences while still allowing the personal information to be retained only on the user device, without further transmission.

Figure 1:
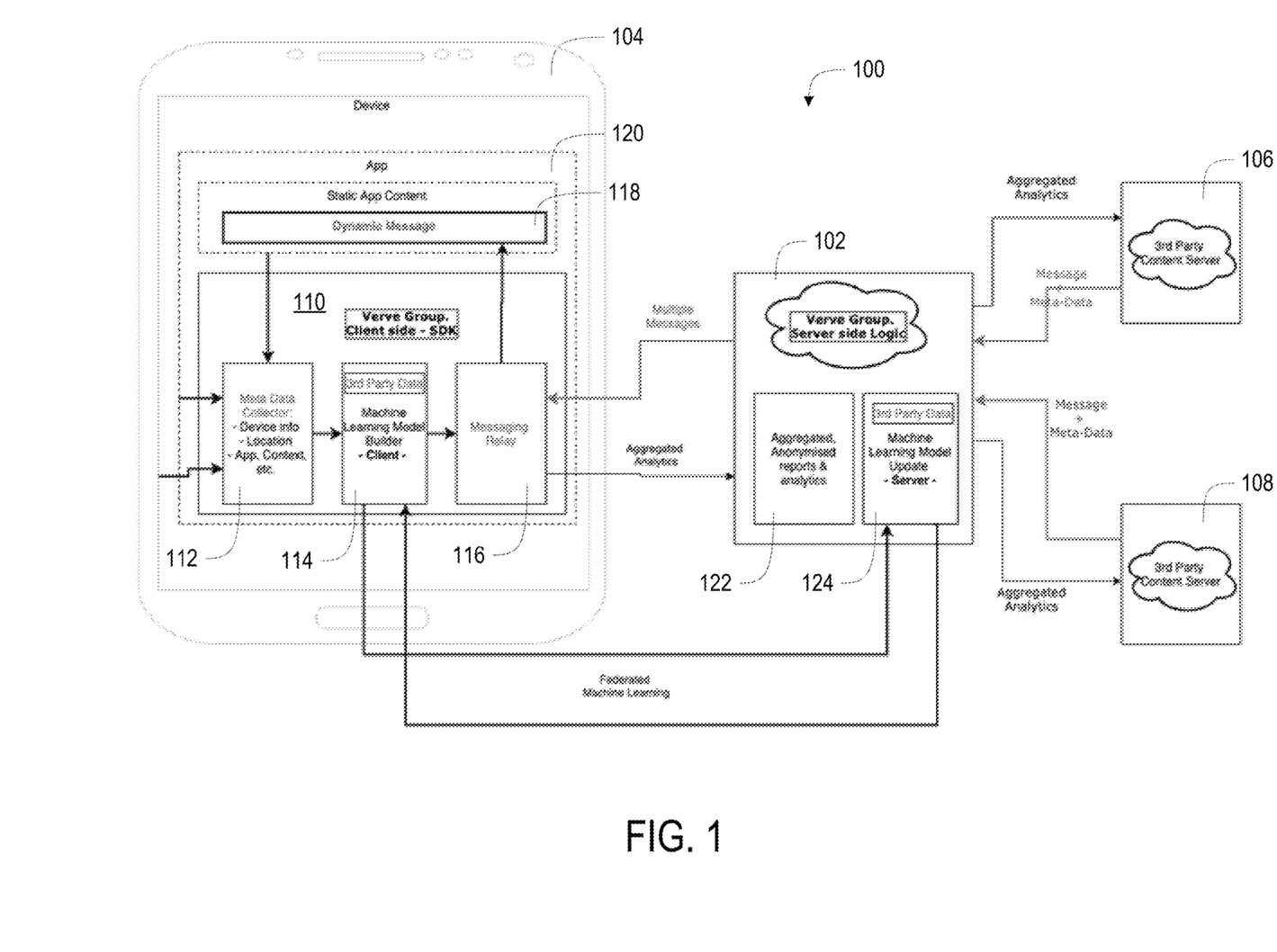
FIG. 1 is a block diagram of an example system for implementing privacy-supporting messaging, according to various embodiments.

FIG. 1 illustrates the various components of an example system 100 for providing privacy-compliant messaging, according to various embodiments. In the depicted embodiment, system 100 includes a central server 102, which is in data communication with a user device 104 and one or more third-party content servers 106, 108. Central server 102 may be a single computer device, such as a computer device 500, or a cluster of servers, such as a data center, or a distributed network-accessible service, such as a cloud service. User device 104 may be any suitable computing device used by a user, such as a smartphone, tablet, laptop, desktop, or a similarly suitable computing device, such as computer device 500. User device 104 may be capable of wired and/or wireless communication channels, which may be utilized to communicate with central server 102 and/or third-party content servers 106 and 108.

Third-party content servers 106 and 108, in embodiments, receive analytics from central server 102, which may be digests, anonymized information, or aggregated anonymized information, that reflect the likelihood that a user of user device 104 possesses various attributes and/or interests. In response, content servers 106 and 108 may provide messaging content that is targeted to the user of user device 104, based upon the received analytics. While only two third-party content servers 106 and 108 are illustrated, it should be understood that any arbitrary number of third-party content servers 106, 108 may interact with central server 102 for providing targeted messaging content. Furthermore, while only one user device 104 is depicted, it should be understood that any arbitrary number of user devices 104 may associate with central server 102.

In embodiments, central server 102, also known as a "training server", may include an analytics module 122 and an update server 124. Central server 102, in embodiments, coordinates with the software stack 110 on the user device 104 to supply initial machine learning models global parameters such as weights to the client-side machine learning model builder 114, discussed below. Central server 102 may execute a training network. The training network, in some embodiments, employs one or more proprietary machine learning algorithms, such as but not limited to deep learning neural networks, to refine models generated by user device 104 (discussed below) by using aggregated or otherwise anonymized parameter updates from the analytics module 122. In some embodiments, the results of analyses of personal information may be fed back into the training network to further refine future results.

Analytics module 122 collects and aggregates data from various devices to be used by the training network. Analytics module 122 may also coordinate with the training network for obtaining parameter updates based upon the results of the training network's analysis of the aggregated data. The data, in embodiments, is not the same as personal information collected on user device 104, but rather is digested or anonymized data generated on device 104 that reflects the demographics/market segment of the user of user device 104, but without requiring the transfer of the actual personal data of the user collected on user device 104. In communication with analytics module 122, the update server 124 periodically sends out updated models and updated model weights to user device 104 (which may be independent or asynchronous of other updates).

In embodiments, user device 104 runs a client side software stack 110. The software stack 110 can include various modules, including a metadata collector 112, a client-side machine learning model builder 114, and a message relay 116. Metadata collector 112 provides contextual information to the machine learning model builder 114. Contextual information could include, but is not limited to, information about user device 104 that is running the software stack 110, location of the user device 104, and contextual information regarding the app 120 with which the user of user device 104 is currently interacting. This information may be usable to predict or otherwise generate a profile of the user, and may further be able to determine or speculate on user intentions, e.g. what the user may be particularly interested in at the current moment or otherwise while using app 120. Depending upon the nature of user device 104, some portion or all of any of the various modules may run upon or be implemented in specialized hardware. For example, some mobile devices that may be used to implement user device 104 may include machine learning hardware, such as a hardware-based neuromorphic processing unit, which may be suitable for or configured to run a portion or all of machine learning model builder 114.

Machine learning model builder 114, in embodiments, interacts with the central server 102 to receive initial models and current global weights for the models and associated parameters. Machine learning model builder 114 further receives data from metadata collector 112 to train the models, to generate updated parameters which are then pushed to the server for aggregation via the messaging relay 116. However, no personally identifiable information, which may include personal information of the user and which may be subject to privacy regulations, is pushed from the user device 104 to the central server 102. Only parameter updates are sent, which do not convey personal information, in embodiments. Thus, system 100 provides a "privacy by default" approach, where data is simply not available to or sent to the central server 102. This contrasts with a "privacy by design" approach, e.g., encryption, where data (that may include personal/private information) could be made available or sent to central server 102, but either first encrypted or pseudo-anonymized. Furthermore, development and optimization of machine learning models based on a multitude of individual models in the exchange between the end devices, such as one or more of user device 104, and/or the central server 102 may be accomplished, in embodiments, in such a way that these are used to further train and/or improve attribution, grouping, segmentation and other models within a group of devices or globally, using federated machine learning, to optimize on-device targeting.

A privacy by design approach that employs encryption may result in a more compute-intensive process for both user device 104, which may detrimentally impact device battery life, and central server 102, which may require greater computing power with its commensurate increased expense and potentially greater power consumption. Also, any transfer of personal data from user device 104 to central server 102 (or any other network transit) runs the risk of interception and, even if encrypted, the encryption may be defeated, allowing the private data to be publicly exposed. Moreover, even if private data can be securely transferred from user device 104 to central server 102 without compromise, if central server 102 is compromised, e.g. a data breach, personal information collected from a large number of user devices 104, and hence a large number of users, may be publicly exposed. In embodiments, the privacy by default approach of system 100 can avoid such scenarios by avoiding any transfer of private or personal information from user device 104. Furthermore, in some embodiments, the personal information/private data can be wiped from user device 104 once analysis of the data, such as by the machine learning model, is complete. Thus, in embodiments, the personal information/private data need only be stored temporarily on user device 104, which itself typically is kept under the control of the user. Furthermore, because the "privacy by default" approach allows the user of user device 104 full control over their personal information, the user can proactively delete data that is stored on-device.

Machine learning model builder 114 relies upon one or more machine learning models for digestion and analysis of personal information obtained on user device 104. The models may include, in various embodiments, a home association model, an age/gender affinity model, a point of interest (POI)-based model, and/or a contextual model. The home association model may be used to predict the location of a user's home, from which the corresponding demographic audience(s) can be estimated, such as by reference to publicly available demographic and geographic databases, GIS systems, etc. The age/gender affinity model may be used, as the name suggests, to predict the age and gender of the user. The POI-based model can be used to create an audience segments based on frequent locations, e.g. gym goers. From this information, additional segmentation may be possible, e.g. likely purchasers of sports equipment, health food, etc. The contextual model may be used to determine a user's intent from context, e.g. new car buyers, who in turn may also be interested in ancillary goods/services, such as insurance, aftermarket accessories; depending upon the type of car purchased (which may also include POI-based information), other segmentation may be ascertained. Still further, in some embodiments other models may also be employed to obtain specific demographics/relevant market segments. Some implementations may use a hybrid of one or more of the foregoing models, and in some implementations, some models may essentially be a subset or specific use case of a more broad model. For example, the POI-based model may be considered to be a specific type of contextual model.

One or more of the foregoing models may be obtained from central server 102, as a base model. Machine learning model builder 114 may then engage in training the model, possibly using parameters received from central server 102 as a starting point or to direct training, with the training performed using personal data obtained locally on user device 104. The machine learning model training, in embodiments, is performed on the user device 104. In order to minimize disruptions to the user behavior (which may be needed for data collection), the training can be scheduled to start only during night time and/or when the user device 104 is charging, and/or the app 120 is in the background. In embodiments, the various models can generate a demographic/psychographic profile for the user of user device 104, which in turn can be used as an addressable segment for customized messaging. In other embodiments, machine learning model builder 114 may be at least partially trained or fully trained using sample or training data sets by central server 102 or another external system prior to being provided to user device 104.

Following preparation of the demographic/psychographic profile by the model(s) from the user's private data, messaging relay 116, which is in communication with central server 102, may provide analytics based upon the profile and data to central server 102. Central server 102, as mentioned above, may also utilize a machine learning model for processing and aggregating the analytics. In some embodiments, the machine learning model on central server 102 may also generate revised parameters for use with the various machine learning models that are supplied to user device 104. The aggregated analytics may be supplied to one or more of the third party content servers 106, 108, which in turn may supply targeted messaging or messaging content determined to be an appropriate fit to the aggregated analytics. Central server 102 may pass these targeted messages, either one or a plurality of messages, back to user device 104 by way of messaging relay 116.

App 120 may be configured to receive one or more messages 118, which may be received from messaging relay 116. The messages 118 may be dynamic and may be targeted based upon the demographic/psychographic profile. Messaging relay 116 may receive multiple messages, and may select from the provided multiple messages a particular message 118 for display. The selection of a particular message 118 by messaging relay 116 may be partially or fully handled by model builder 114, which is in communication with messaging relay 116 in various embodiments. Message 118 may be changed or rotated through a selection of possible messages on a periodic basis.

Figure 2:
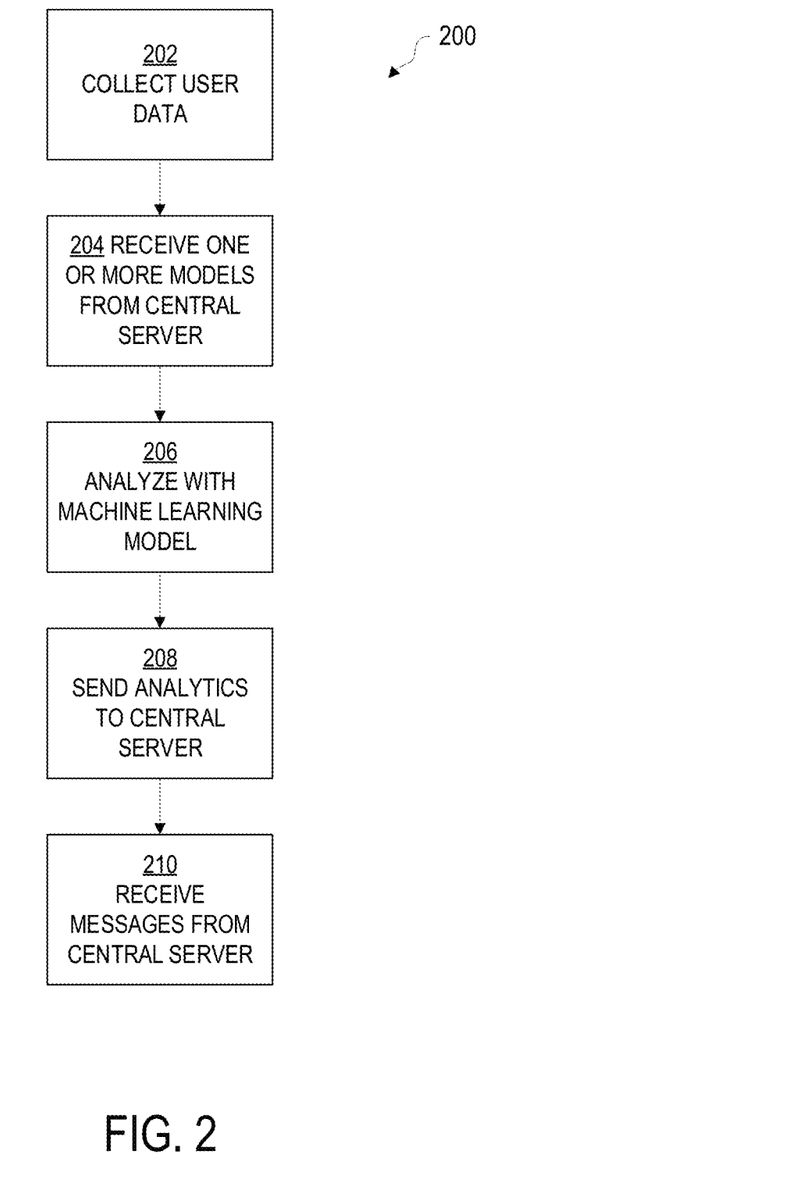
FIG. 2 is a flow chart of an example method for privacy-supporting messaging that may be implemented by a user device that may be part of the example system of FIG. 1, according to various embodiments.

FIG. 2 is a flowchart of an example method 200 that may be executed by a user device, such as user device 104 that is a part of system 100. Depending on the embodiment, the operations of method 200 may be implemented in whole or in part. Not all operations of method 200 may be implemented, and/or additional operations may be included that are not depicted. One or more operations may be executed in a different order than depicted.

In operation 202 of the depicted embodiment, the user device or an app running thereon may collect user data in the form of various types of personal data on a user of the user device. The data may include activities and usage by the user of the user device, location information, visited points of interest, browsing habits/websites, apps used, media consumed, analysis of pictures/videos captured, captured user profile information, and/or any other information useful to generating a demographic profile on the user. In embodiments, this user data may be stored locally on the user device, possibly temporarily, and is not otherwise transmitted to a system outside of the user device.

In operation 204 of the depicted embodiment, the user device may receive one or more models from a central server, such as central server 102, for analyzing the collected information. Different models may be used depending upon the nature of the desired profile. For example, a point of interest model may prioritize analysis of geolocation data, while an age/gender affinity model may prioritize browsing habits and/or interaction with various applications. The user device may also receive updates to existing models and/or updates to baseline parameters to be used with one or more of the received models.

In operation 206 of the depicted embodiment, one or more models are selected from the models received from the central server. The selected model(s) is/are then used by the user device to analyze the user data to generate analytics that reflect demographics of the user of the user device without revealing any of the user data. In some embodiments, collected user data may be initially used to train the selected models. In other embodiments, the central server may make available a training data set. In still other embodiments, the baseline models provided by the central server may be pre-trained to focus on the intended analytics the model is designed to provide.

The analytics may comprise, at least in part, probabilities for one or more demographics that may be associated to a user of the user device, such as user device 104. For example, the analytics may indicate that the user of the user device has a 0.1 probability (e.g., 10%) of being associated with a Spanish speaker, and has a 0.5 probability (e.g., 50%) of being associated with a female. Furthermore, the user device may also generate additional data about possible improvements to the one or more models, such as algorithm parameters and/or equations that allow for the model(s) to be tuned. In embodiments where the models involve machine learning, these parameters may be adjusted on the user device as the model processes more data over time, which may be part of the process of training the model. In keeping with a "privacy by default" approach, the associated demographics and parameters are fully anonymized, and do not trace back to the user data/personal information used for processing by the model(s).

In operation 208 of the depicted embodiment, these analytics are then sent back to the central server by the user device. In response, in operation 210 of the depicted embodiment the user device may receive one or more messages from the central server. The user device may then present one or more of the messages to the user of the user device on a periodic basis. The user device may select from the one or more messages based upon the analytics developed in operation 206.

Figure 3:
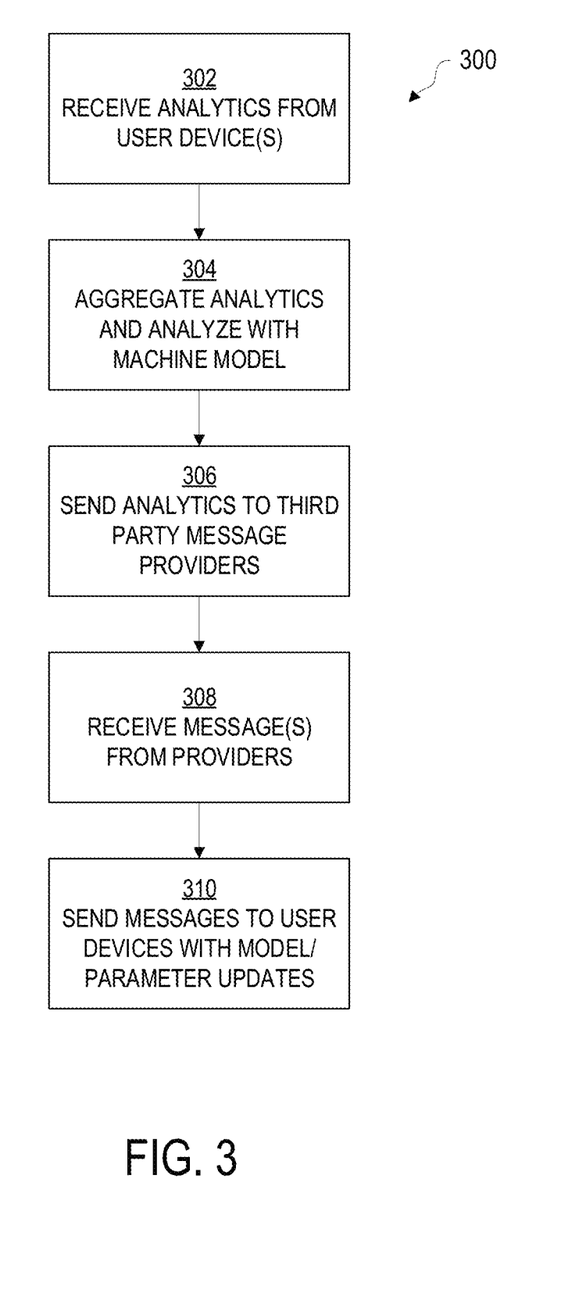
FIG. 3 is a flow chart of an example method for privacy-supporting messaging that may be implemented by a central server that may be part of the example system of FIG. 1, according to various embodiments.

FIG. 3 is a flowchart of an example method 300 that may be executed by a server, such as central server 102 that is a part of system 100. Depending on the embodiment, the operations of method 300 may be implemented in whole or in part. Not all operations of method 300 may be implemented, and/or additional operations may be included that are not depicted. One or more operations may be executed in a different order than depicted.

In operation 302 of the depicted embodiment, the central server receives analytics, in the form of anonymized user data, from a user device, such as user device 104. The received analytics are not and do not include any personal information or information that could otherwise be used to disclose private aspects of a user of the user device. Rather, the received analytics reflect predicted demographics of the user, based upon machine analysis of user data collected by the user device.

In operation 304 of the depicted embodiment, the central server aggregates the analytics with other analytics. The other analytics may have been previously provided by the user device or another user device. The central server may analyze the aggregated analytics using machine learning, such as a machine learning model, to derive demographic information about various market segments represented by various users of multiple user devices in communication with the central server. One or more different models may be employed depending upon the desired demographic analysis. As mentioned above with respect to method 200, the central server can receive analytics both in the form of anonymized demographic information and probabilities, as well as parameters for algorithms and/or equations developed by the user device as it employs the baseline models. These analytics, as mentioned below with respect to operation 308, may in turn be used to tune the machine learning model employed by the central server, albeit on a much greater scale than the model(s) employed by the user device, so that the aggregated analytics are determined with increasing precision as the user device analytics are incorporated.

In operation 306 of the depicted embodiment, the aggregated analytics/market segments are sent to one or more third party message providers, which may use the aggregated analytics to select messages targeted to a given market segment, as reflected by the analytics.

In operation 308 of the depicted embodiment, messages selected by one or more of the third party message providers are received by the central server. In operation 310 of the depicted embodiment, the provided messages are in turn sent to the user device for selection and display to a user of the user device. The central server may also provide updates to the baseline models and/or updates to the relevant parameters to the baseline models, for use by the user device in analyzing the user data. These updated baseline models may have been determined in operation 304, discussed above. Thus, method 200 on a user device, with baseline models, may work synergistically with method 300 on a central server, with a machine learning network, in an iterative fashion to continually tune and refine the baseline models that are pushed to the user devices, to allow the analytics provided by the central server to the third party message providers to continually improve in accuracy and, consequently, result in increasingly better targeting of messaging.

Figure 4:
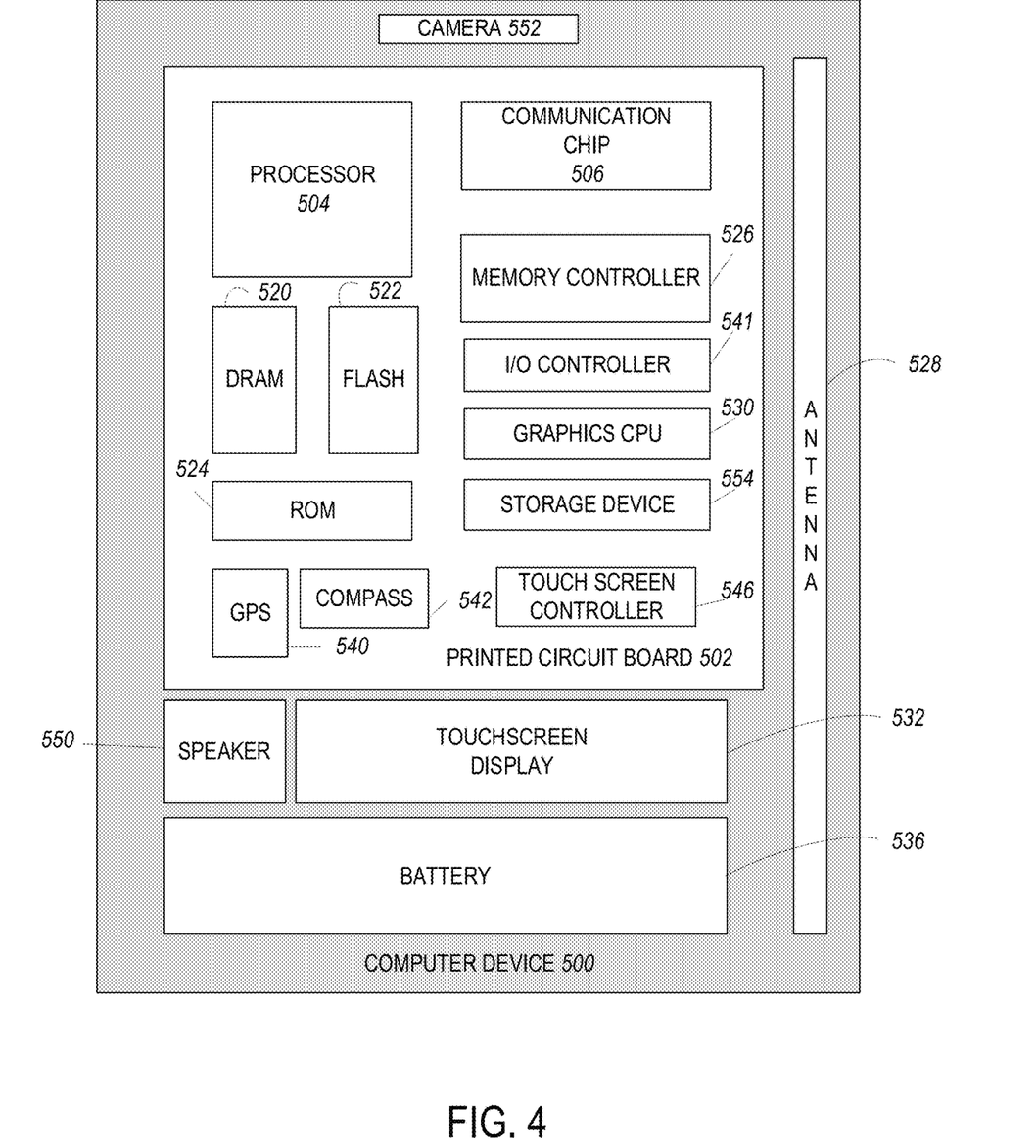
FIG. 4 is a block diagram of an example computer that can be used to implement some or all of the components of the system of FIG. 1, according to various embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include a Neuromorphic Processing Unit (NPU) and or hardware supporting neural networks. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100, method 200 and method 300 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
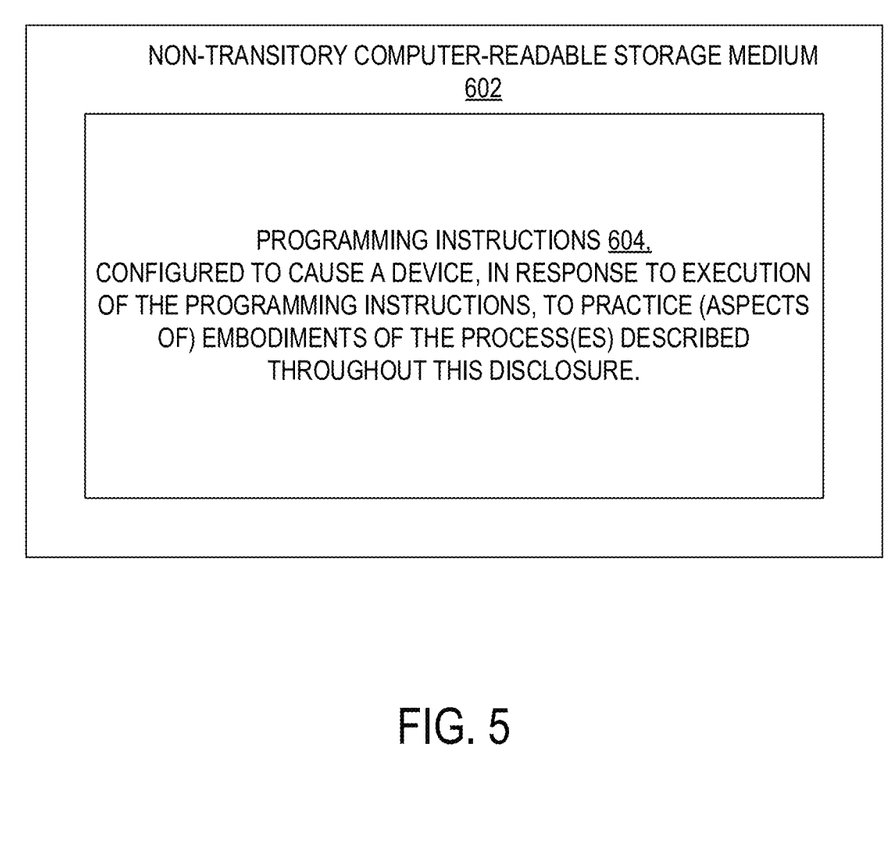
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, and/or method 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may be implemented in any suitable fashion, including, but not limited to, mobile applications (e.g. apps to be executed on a mobile device), web browser-executable code, web pages, and/or any other platform for executing computer program instructions.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks, such as of FIGS. 2 and 3.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

EXAMPLES

The following are possible examples of embodiments of the disclosed systems and methods:

Example 1 is a non-transitory computer readable medium (CRM) comprising instructions that, when executed by an apparatus, cause the apparatus to: receive, from one or more user devices, anonymized data about a user of each of the one or more user devices; analyze the anonymized data with one or more machine learning models to obtain aggregated analytic data; send the aggregated analytic data to the one or more third party message providers; and receive, from at least one of the one or more third party message providers, one or more messages for display on one of the one or more user devices, the one or more messages targeted based upon the aggregated analytic data.

Example 2 includes the subject matter of example 1, or some other example herein, wherein the instructions are to further cause the apparatus to transmit one or more machine learning models to each of the one or more user devices.

Example 3 includes the subject matter of either example 1 or 2, or some other example herein, wherein the instructions are to further cause the apparatus to transmit the one or more messages to the one or more user devices.

Example 4 includes the subject matter of any of examples 1-3, or some other example herein, wherein the instructions are to further cause the apparatus to obtain the aggregated analytic data with a machine learning model.

Example 5 includes the subject matter of any of examples 1-4, or some other example herein, wherein the apparatus is a central server.

Example 6 is a method, comprising collecting, by a user device, data about a user of the user device; analyzing, by the user device, the data about the user to obtain one or more anonymized demographics about the user that cannot be used identify the user; transmitting, by the user device, the anonymized demographics to a remote server; and receiving, by the user device, one or more messages for display to the user, the one or more messages selected based upon the anonymized demographics.

Example 7 includes the subject matter of example 6, or some other example herein, wherein collecting data about the user of the user device comprises collecting data about the user's activities on the device, including location, app usage, and browsing history.

Example 8 includes the subject matter of either example 6 or 7, or some other example herein, wherein analyzing the data about the user to obtain one or more anonymized demographics about the user comprises analyzing, by the user device, the data using a machine learning model.

Example 9 includes the subject matter of example 8, or some other example herein, further comprising receiving, by the user device, the machine learning model from a central server.

Example 10 includes the subject matter of example 9, further comprising receiving, by the user device, periodic updates to the machine learning model from the central server.

Example 11 includes the subject matter of any of examples 8-10, or some other example herein, further comprising using the one or more anonymized demographics to adjust the machine learning model.

Example 12 includes the subject matter of any of examples 8-11, further comprising analyzing the data using a plurality of machine learning models, each of the plurality of machine learning models configured to obtain a different type of anonymized demographic.

Example 13 includes the subject matter of any of examples 6-12, or some other example herein, wherein the method is implemented upon the user device using a non-transitory computer-readable medium comprising instructions that are executable by a processor of the user device.

Example 14 is a method, comprising receiving, from one or more user devices, anonymized data about a user of each of the one or more user devices; analyzing the anonymized data to obtain aggregated analytic data; sending the aggregated analytic data to the one or more third party message providers; and receiving, from at least one of the one or more third party message providers, one or more messages for display on one of the one or more user devices, the one or more messages targeted based upon the aggregated analytic data.

Example 15 includes the subject matter of example 14, or some other example herein, further comprising transmitting one or more machine learning models to each of the one or more user devices.

Example 16 includes the subject matter of example 15, or some other example herein, further comprising adjusting, using the anonymized data, the one or more machine learning models that are sent to each of the one or more user devices to obtain one or more adjusted machine learning models; and transmitting the one or more adjusted machine learning models to each of the one or more user devices.

Example 17 includes the subject matter of any of examples 14-16, or some other example herein, wherein analyzing the anonymized data to obtain aggregated analytic data comprises analyzing the anonymized data with one or more machine learning models.

Example 18 includes the subject matter of any of examples 14-17, further comprising transmitting, to the one or user devices, the one or more messages for display.

Example 19 includes the subject matter of example 16, or some other example herein, wherein adjusting the one or more machine learning models further comprises employing federated machine learning in connection with a plurality of user devices.

What is claimed is:

1. A non-transitory computer readable medium (CRM) comprising instructions that, when executed by an apparatus, cause the apparatus to:
   receive, from each of one or more user devices, analytics about a user of each of the one or more user devices, the analytics comprising probabilities for one or more demographics associated with the user of each of the one or more user devices, the analytics predicted by each of the one or more user devices for their respective users and based at least in part on device context information;
   aggregate, using one or more machine learning models selected with respect to a selected demographic analysis, the received analytics to obtain aggregated analytic data, the aggregated analytic data useable as an addressable segment for customized messaging;
   send the aggregated analytic data to the one or more third party message providers; and
   receive, from at least one of the one or more third party message providers, one or more messages for display on one of the one or more user devices, the one or more messages targeted to the addressable segment.

2. The CRM of claim 1, wherein the instructions are to further cause the apparatus to transmit the one or more machine learning models to each of the one or more user devices.

3. The CRM of claim 1, wherein the instructions are to further cause the apparatus to transmit the one or more messages to the one or more user devices.

4. The CRM of claim 1, wherein the instructions are to further cause the apparatus to use machine learning model parameters received from the one or more user devices to tune the one or more machine learning models.

5. The CRM of claim 1, wherein the apparatus is a central server.

6. A method, comprising:
   collecting, by a user device, data about a user of the user device;

collecting, by the user device, contextual information about the user device;

analyzing, by the user device using a machine learning model, the data about the user and the contextual information to obtain one or more analytics comprising probabilities for one or more demographics about the user that cannot be used to identify the user and can be used as an addressable segment for customized messaging, the machine learning model selected based on a target profile of the user device;

transmitting, by the user device, the analytics to a remote server;

receiving, by the user device, a plurality of messages, the plurality of messages selected based upon the analytics; and selecting, by the user device, a message of the plurality of messages for display to the user.

7. The method of claim 6, wherein collecting data about the user of the user device comprises collecting data about the user's activities on the user device, including location, device metadata, app usage, and browsing history.

8. The method of claim 6, further comprising receiving, by the user device, the machine learning model from a central server.

9. The method of claim 8, further comprising receiving, by the user device, periodic updates to the machine learning model from the central server.

10. The method of claim 6, further comprising using the data about the user and the contextual information to adjust the machine learning model.

11. The method of claim 6, further comprising analyzing the data about the user and the contextual information using a plurality of machine learning models, each machine learning model of the plurality of machine learning models configured to obtain a different type of analytic.

12. The method of claim 6, wherein the method is implemented upon the user device using a non-transitory computer-readable medium comprising instructions that are executable by a processor of the user device.

13. A method, comprising:

receiving, from each of one or more user devices, analytics about a user of each of the one or more user devices, the analytics comprising probabilities for one or more demographics as well as other characteristics, the other characteristics comprising user interests or purchase intent, associated with the user of each of the one or more user devices, the analytics predicted by each of the one or more user devices at least in part from device context information;

aggregate, using one or more machine learning models selected with respect to a selected demographic analysis, the received analytics to obtain aggregated analytic data, the aggregated analytic data useable as an addressable segment for customized messaging;

sending the aggregated analytic data to the one or more third party message providers; and receiving, from at least one of the one or more third party message providers, one or more messages for display on one of the one or more user devices, the one or more messages targeted or customized to the addressable segment.

14. The method of claim 13, further comprising transmitting one or more machine learning models to each of the one or more user devices.

15. The method of claim 14, further comprising:

adjusting, using the aggregated analytic data, the one or more machine learning models that are transmitted to each of the one or more user devices to obtain one or more adjusted machine learning models; and transmitting the one or more adjusted machine learning models to each of the one or more user devices.

16. The method of claim 15, wherein adjusting the one or more machine learning models further comprises employing federated machine learning in connection with a plurality of user devices.

17. The method of claim 13, further comprising transmitting, to the one or user devices, the one or more messages for display.

* * * * *